(12) United States Patent
Li et al.

(10) Patent No.: US 7,254,575 B1
(45) Date of Patent: Aug. 7, 2007

(54) SYSTEM AND METHODS FOR IMPLEMENTING AN ADAPTIVE OBJECT MODEL

(75) Inventors: Norris V. Li, Newton, MA (US); Valery Altman, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 497 days.

(21) Appl. No.: 10/814,663

(22) Filed: Mar. 31, 2004

(51) Int. Cl.
*G06F 17/30* (2006.01)
*G06F 7/00* (2006.01)

(52) U.S. Cl. ............... 707/3; 707/4; 707/5; 707/104.1
(58) Field of Classification Search .............. 707/1–10, 707/104.1; 709/220, 223
See application file for complete search history.

(56) References Cited

U.S. PATENT DOCUMENTS 6,584,499 B1 * 6/2003 Jantz et al. ................. 709/220
2002/0178243 A1 * 11/2002 Collins ....................... 709/223

* cited by examiner

*Primary Examiner*—Hosain Alam
*Assistant Examiner*—Sangwoo Ahn
(74) *Attorney, Agent, or Firm*—Chapin IP Law, LLC; Barry W. Chapin, Esq.

(57) ABSTRACT

In a managed information environment, such as a storage area network, a management application typically monitors and controls a plurality of manageable entities such as storage array devices. The manageable entities may emanate from multiple providers, or vendors, each having dissimilar interfaces and parameters. A common object model operable to normalize and represent device specific parameters that define a plurality of dissimilar manageable entities such as storage array devices enables interrogation and manipulation of the dissimilar storage devices for performing management and control via the management application. The management application selects, based on the device type, a representation in the common object model enumerating the device specific parameters of the storage device. Enumeration may involve identifying corresponding attributes between the device specific parameters and the attributes of the common object model, and copying, translating, or converting the corresponding fields. In this manner, the management application normalizes and performs manipulations of the dissimilar storage devices using the common object model.

20 Claims, 7 Drawing Sheets

SYSTEM AND METHODS FOR IMPLEMENTING AN ADAPTIVE OBJECT MODEL

BACKGROUND OF THE INVENTION

In a typical conventional storage area network, one or more storage arrays having very large amounts of data storage capacity are connected through connectivity devices, such as switches, to host computer systems that operate as servers of data to client computer systems that request the data from the storage arrays. The storage area network is thus a network that interconnects host, connectivity and storage elements in a storage environment and ensures fault-free and timely access to the data for client users via the host servers. Such a storage area network employs a conventional storage area network management application to monitor and control (i.e., to manage) the host, connectivity and storage elements in the network. Management of the storage area network by the network management application allows optimal usage and throughput in the storage area network by identifying areas of contention, reporting malfunctions, providing access control, and allocating ports and data flow paths between the host and storage devices in the storage area network.

The conventional network management application employs software components executing on, within, or in conjunction with the various manageable elements in the storage environment to effect management of these elements within the storage area network. Typically, a repository such as a database operates in conjunction with the network management application in order to map the manageable elements (e.g., host, storage devices, switches, and software processes) that comprise the storage area network environment into data structures that the network management application may employ to manage the network elements. The repository typically includes respective element definitions for each manageable entity in the storage area network. Each element definition in the repository includes or defines information such as types and attributes (characteristics) and associated attribute values of the element, relationships between that element and other elements, as well as topology, diagnostic, and historical data concerning that storage area network element, or manageable entity, as it operates within the storage area network.

The management application therefore, monitors and controls each of the storage are network elements, or manageable entities, in the storage area network by storing the type and attribute information of the various manageable entities. In a large SAN, there may be many deployable manageable entities of various types, each having type and attribute information. Developing and maintaining the conventional management application to store, manipulate, and report on the various types and attributes of the multitude of manageable entities presents a formidable endeavor, since the conventional manageable entities encompass different types having different sets of attributes, and may even be from different vendors.

SUMMARY

In a conventional managed information environment, such as a storage area network (SAN), a management application typically monitors and controls a plurality of manageable entities such as storage array devices. The storage array devices are typically arrays of storage elements such as disk drives. Each of the disk drives has individual characteristics, and the storage array device interconnects each disk drive to define an aggregate storage array device. The storage array device, therefore, has a plurality of parameters corresponding to various characteristics such as the number of disk drives, the size of each drive, the latency time, and arrangement characteristics such as grouping of drives for shadowing, redundancy, etc.

In a conventional managed information environment, an aggregation of manageable entities, such as the storage array devices, are interconnected by the storage area network. Each of the manageable entities may exhibit different device specific parameters. Further, the manageable entities may emanate from multiple providers, or vendors, each having dissimilar interfaces and parameters. A conventional SAN operator employing a conventional management application may need several vendor-specific management applications corresponding to each vendor's products to monitor and control the manageable entities from the different vendors, or may need to perform separate operations to each set of vendor specific devices and/or groups of devices demarcated by common device parameters. The exemplary managed information environment discussed herein is a storage area network (SAN), however the disclosed object model and accompanying methods and operations are applicable to a variety of alternate configurations, such as via NAS (Network Attached Storage) or direct attached storage devices.

Accordingly, configurations and embodiments of the invention are based, in part, on the observation that a managed information environment having different devices and/or dissimilar vendor origin may be cumbersome to monitor and control due to the need to accommodate different device specific parameters of each of the different devices. Dissimilar devices, even different devices of the same type, such as different varieties of storage array devices, often have different interfaces, and therefore provide different device specific parameters for monitoring and control. Conventional management applications need to interact with the application programming interface (API) of each device by using the expected device specific parameters in order to monitor and control the device. Since no single conventional management application provides this capability, conventional solutions to this issue provide different conventional applications, each corresponding to a particular API having particular device parameters, may be employed, or alternatively, multiple operations with the same conventional management application, in which each operation caters to a particular API, may be employed. Accordingly, it would be beneficial to provide a common object model operable to normalize and represent a plurality of dissimilar sets of device specific parameters corresponding to each of a plurality of storage devices, each having a corresponding dissimilar API.

Configurations and embodiments of the invention substantially overcome the above-described shortcomings with respect to handling manageable entities with different device specific parameters by providing a common object model operable to normalize and represent device specific parameters defining a plurality of dissimilar manageable entities such as storage devices. The common object model is adapted for operation by a management application operable to perform interrogation and manipulation of the different storage devices for performing management and control of each of the storage devices via the common object model. The plurality of storage devices are recognizable by the management application via the common object model. The storage devices each have device specific parameters according to a device type, such as vendor and model. The management application selects, based on the device type, a representation in the common object model enumerating the common and the device specific parameters of the storage device. Enumerating may involve identifying corresponding attributes between the device specific parameters and the attributes of the common object model, and copying, translating, or converting the corresponding fields. In this manner, the management application may perform queries and manipulations of each of the storage devices using the common object model.

In further detail, the method for modeling and organizing data via the common object model includes enumerating a plurality of device specific parameters in the common object model, in which the model is adapted to normalize distinctions between the device specific parameters of the various storage array devices. The common object model adapts the device specific parameters corresponding to different devices by including normalized parameters for each of the different devices to be represented. The management application receives a user request for a device query concerning a storage array device, in which the device query is indicative of the device specific parameters corresponding to one or more of the dissimilar devices in the SAN having different device specific parameters.

The management application employs the common object model to compute a query response responsive to the user request, in which the computation employs the appropriate normalized parameters from the common object model. The management application, therefore, in computing the query response, further interrogates device specific agents corresponding to the type of storage array device to which the query applies. The management application then displays the query response to the user by employing the computed normalized parameters in a graphical user interface (GUI), in which the normalized parameters are independent of the device specific parameters of a particular device.

The management application computes the query response employing the included device specific parameters in a selective manner as appropriate to the particular device. In the exemplary configuration, the devices are typically storage arrays corresponding to a plurality of vendors, in which each of the vendors has an independent device interface specification. Accordingly, the devices correspond to a plurality of different interface specifications. Further, each of the storage array devices typically including a varying arrangement of subdevices (e.g. disk drives). Therefore, the device specific parameters include back end parameters, in which the back end parameters are indicative of specific subdevices within the device. Each of the subdevices (disk drives) have independent storage device attributes, such that each of the storage device attributes correspond to attributes of the object model.

In the particular exemplary configuration, development of the common object model for use by the management application includes analyzing an interface specification indicative of the device specific parameters, and identifying similarities between the device specific parameters corresponding to devices of different vendors. A developer or automated process enumerates the similar device specific parameters corresponding to other device specific parameters (i.e. groupings or sets of parameters or attributes corresponding to multiple device types), and defines the enumerated device specific parameters as indicative of a common parameter in the common object model. Further, certain storage array devices may have device specific parameters not found with respect to other types of storage array devices. Accordingly, translating device specific parameters to corresponding parameters in the common object model further includes matching one or more device specific parameters to a common object model parameter, and computing an equivalent value for the common object model parameter, in which the common object model parameter is adaptable to, or made applicable to, the device specific parameters of other devices, i.e. by computing, translating, or otherwise converting parameters or attributes to common quantities or units, such as bytes or milliseconds.

The invention as disclosed above is described as implemented on a computer having a processor, memory, and interface operable for performing the steps and methods for monitoring and processing timer events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
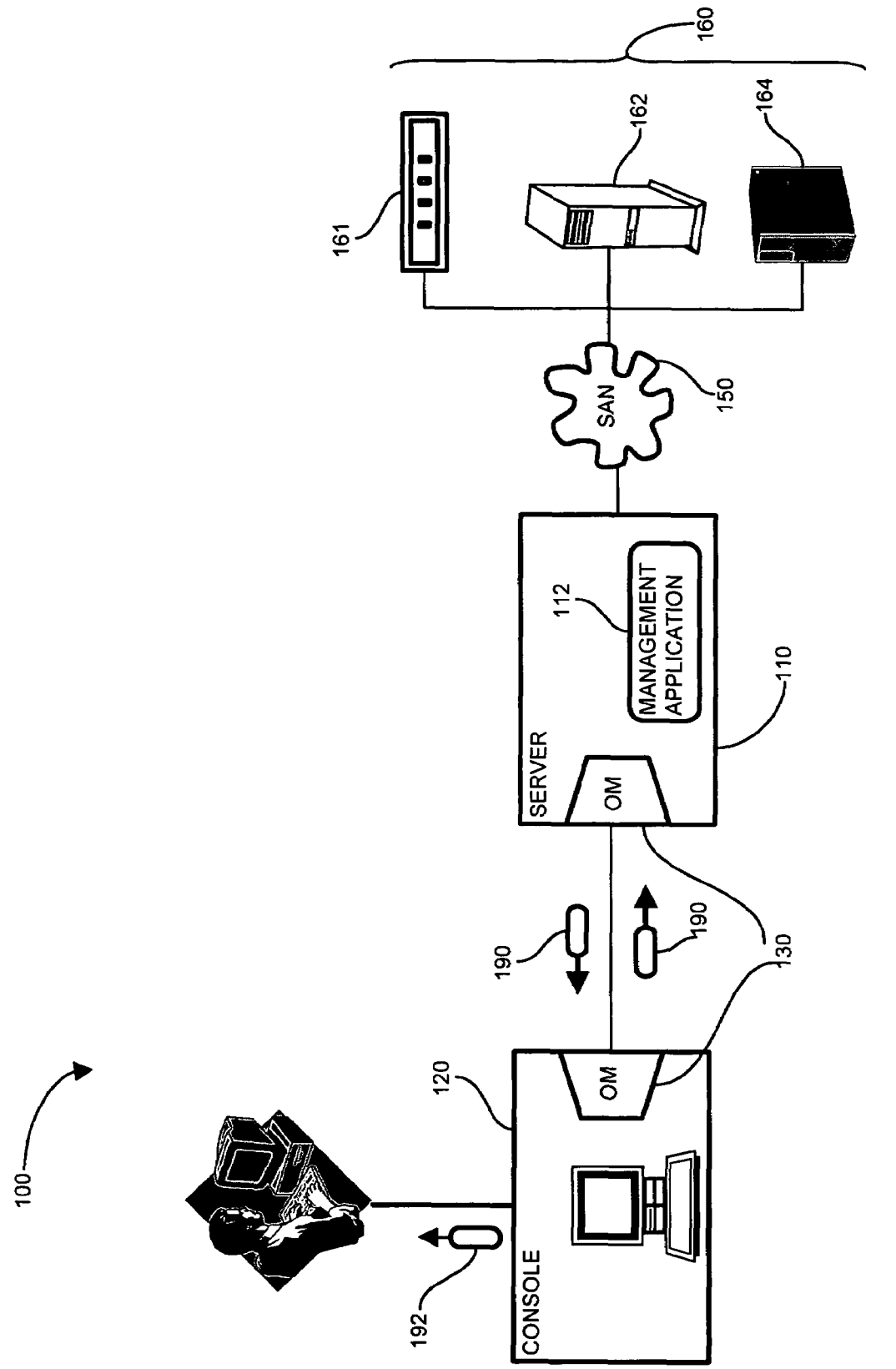
FIG. 1 is a context diagram of an exemplary managed information environment including a storage area network and suitable for use with the present invention.

A conventional managed information environment having different devices and/or dissimilar vendor origin may be cumbersome to monitor and control due to the need to accommodate different device specific parameters of each of the different devices. Dissimilar devices, even different devices of the same type, such as storage array devices, often have different interfaces, and therefore present different sets of attributes and parameters for monitoring and control from a management application. Accordingly, it would be beneficial to provide a common object model operable to normalize and represent a plurality of dissimilar sets of device specific parameters corresponding to each of a plurality of storage devices, each having a corresponding dissimilar API.

The embodiments of the invention discussed herein define manageable entities having different device specific parameters by providing a common object model operable to normalize and represent device specific parameters defining a plurality of dissimilar manageable entities such as storage array devices. The common object model is adapted for operation by the management application, which is operable to perform interrogation and manipulation of the various types of storage array devices for performing management and control of each of the storage devices via the common object model. A plurality of such storage array devices are recognizable by the management application via the common object model. The storage devices each have device specific parameters according to a device type, such as vendor and model. The management application selects, based on the device type, a representation in the common object model enumerating the device specific parameters of the storage device. Enumerating may involve identifying corresponding attributes between the device specific parameters and the attributes of the common object model, and copying, translating, or converting the corresponding fields. In this manner, the management application may perform queries and manipulations of each of the storage devices using the common object model.

The device specific parameters, as disclosed herein, refer to parameters which are directly applicable to a particular type of device, such as the exemplary storage array devices discussed herein. The common object model is adaptable to dissimilar storage arrays by collectively storing the relevant parameters for the particular device in question. Many relevant parameters, including both front end and back end parameters discussed further below, are represented by the common object model and are applicable to more than one storage array device. Such parameters are employed as device specific parameters when communicating with a particular storage array device. The common object model is therefore intended to include attributes corresponding to relevant parameters of each of the modeled devices. Extensions to the common object model may be added if a particular device has certain device specific parameters which are not presently enumerated adequately in the common object model.

FIG. 1 is a context diagram of an exemplary managed information environment including a storage area network suitable for use with the present invention. Referring to FIG. 1, the exemplary environment 100 includes a server 110 and a console 120, in which the server 110 connects, directly or indirectly, to a storage area network 150. The server 110 executes a management application 112 responsive to the console 120, for receiving operator input and commands and for displaying corresponding feedback and status. The storage area network 150 interconnects a plurality of manageable entities 160, such as storage array devices 164, host devices 162, and connectivity devices 161. The storage area network 150, as employed herein, denotes a control path from the server to various agents executing on the manageable entities 160 and communicating with the server 110, and does not necessarily denote a particular physical interconnection path. An object model 130 normalizes and stores manageable entity data 190 for storing and communicating data between the server 110 and the console 120, such as performance and throughput data, for storing and generating reports 192 to an operator and for transmitting commands and instructions back to the server 120 for manipulating the manageable entities 160. The object model 130 is operable to store and process data from a variety of types of manageable entities 160, such as the exemplary storage array devices 164, providing a common, normalized instantiation of such data for transmission between the server 110 and the console 120, described further below.

Figure 2:
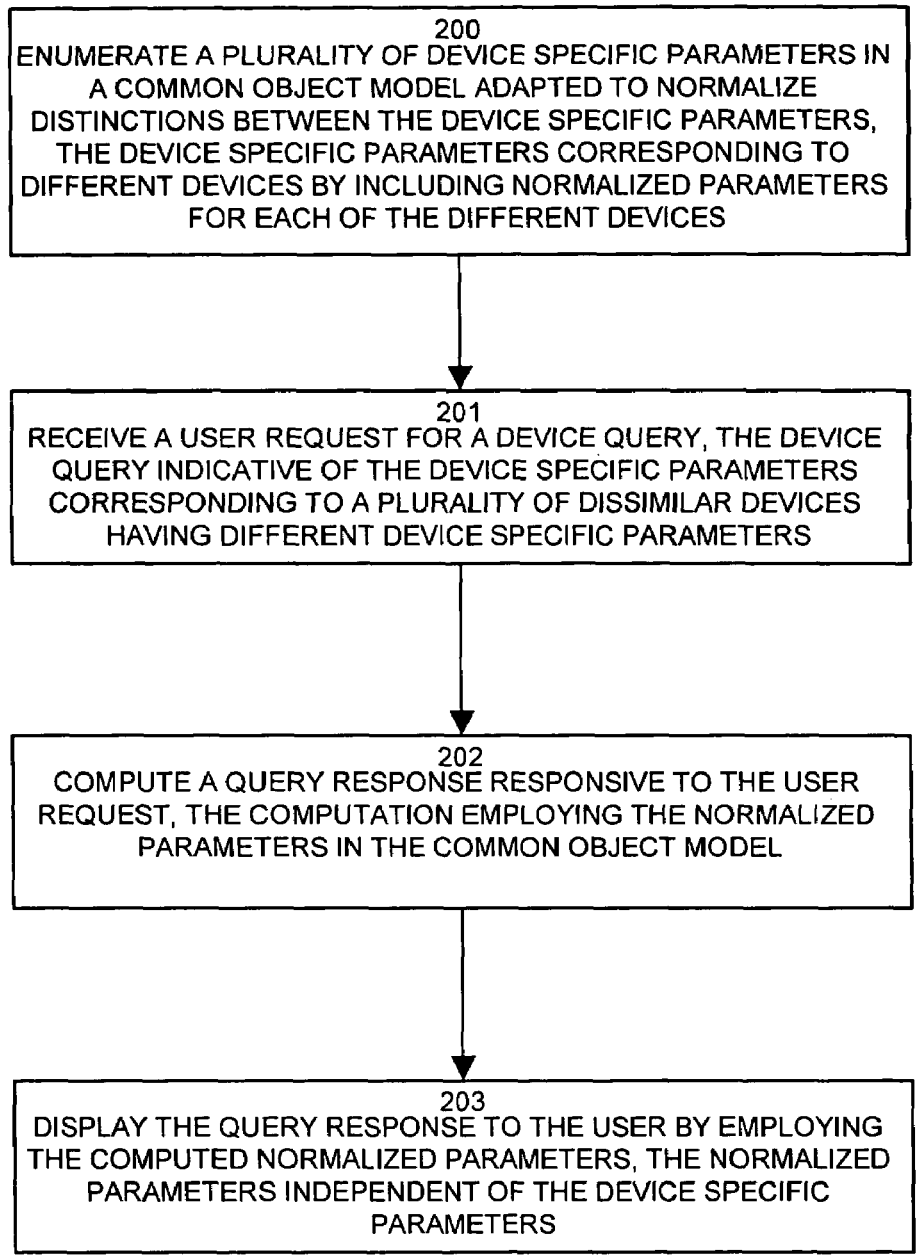
FIG. 2 is a top-level flowchart of modeling devices to the common object model as described herein.

FIG. 2 is a top-level flowchart of modeling devices to the object model as described herein. Referring to FIG. 2, a developer or application enumerates a plurality of device specific parameters in a common object model adapted to normalize distinctions between the device specific parameters, in which the device specific parameters correspond to different devices 164, or manageable entities 160, by including normalized parameters for each of the different devices 164, as depicted at step 200. Typically this enumeration involves synthesizing application programming interfaces (APIs) corresponding to each of the devices 164 to be modeled, described further below.

Having the devices 164 modeled into the common object model 130, the management application 112 receives a request from either a user via the console or from one of the manageable entities 160 via the corresponding agent, as will be discussed further below. In the exemplary configuration, the application 112 receives a user request for a device query, in which the device query is indicative of the device specific parameters corresponding to a plurality of dissimilar devices 164 having different device specific parameters, as shown at step 201. Each of the modeled devices from step 200 need not have similar parameters. The object model 130 normalizes, or commonalizes, dissimilar parameters such that a query response maybe formulated.

The management application 130 then computes a query response responsive to the user request, in which the computation employs the normalized parameters in the common object model 130. The device query 194 interrogates 192 the device specific parameters from a plurality of similar or dissimilar storage array devices 164 to compute a query response 190 to be sent to the console 120. The normalized parameters in the common object model 130 allow computations such as determining the available or used storage area on a storage array device 164. For example, one type of device 164 may employ an API having a data structure specifying tracks and sectors. Another, dissimilar type of device 164 may specify platters and segments, indexing the concentric tracks as consecutive sequences of segments. The exemplary common object model 130 identifies the device specific parameters and stores them in a common field for available disk drive space. The management application 112 then displays the query response 190 to the user by employing the computed normalized parameters, in which the normalized parameters are independent of the device specific parameters, as just describe above.

Figure 3:
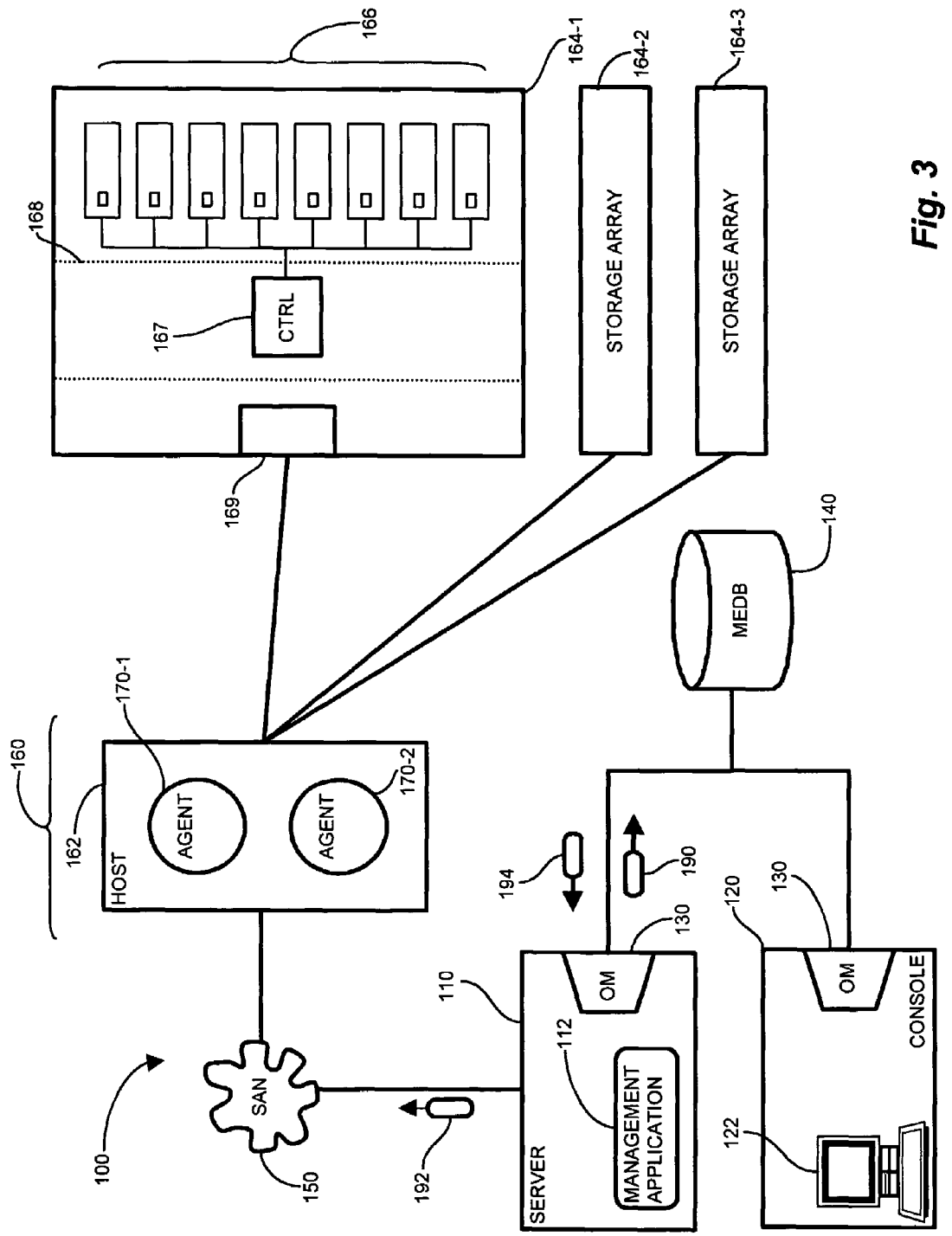
FIG. 3 is a block diagram of a server in the exemplary managed information environment operable according to the system of the present invention.

FIG. 3 is a block diagram of the server 110 in the exemplary managed information environment 100 operable according to the system of the present invention. Referring to FIG. 3, the exemplary managed information environment 100 includes the storage area network 150 (SAN) interconnecting a plurality of manageable entities 160, such as hosts 162 and storage array devices 164-1 . . . 164-2 (164 generally). The SAN 150 may also include other types of manageable entities 160, as discussed above. The manageable entities 160 in the storage area network 150 are responsive to the server 110, operable to execute the management application 112 for monitoring and controlling the manageable entities 160. The server 110 connects to a console 120 via a manageable entity database (MEDB) 140, for receiving operator input, displaying operator feedback, and storing operational data concerning the manageable entities 160. The object model 130, discussed further below, provides an adaptable, normalized manner for representing, storing, and communicating attributes and parameters of the various manageable entities 160.

The exemplary SAN 150 is intended to depict a communication interconnection between the server 110, console 120, and manageable entities 160. In a typical implementation, there may be multiple communication paths, such as an Ethernet based TCP/IP connection for control information, and a fiber channel connection for data throughput. The exemplary SAN 150 interconnection as illustrated in FIGS. 1 and 3 encompasses the various communication mechanism between the console 120, server 110, and manageable entities 160, and in particular configurations may take the form of more specialized communication channels, such as a fiber channel, IDE, or SCSI connection for such data transport to and from the manageable entities 160.

In further detail, the manageable entities 160 are of different types, and each has particular operational characteristics. With respect to storage arrays 164, each storage array 164 typically has a plurality of subdevices, such as disk drives 166. Each disk drive 166 includes a physical storage medium for fixing the data stored thereby in a non-volatile form (i.e. magnetic or optical). A controller 167 manipulates the individual disk drives 166 via a back end interface 168. Typically, the physical disk drives map to logical entities such as groups and partitions. The controller 167 also connects to a front end interface 169 responsive to the host 162. The host 162 includes one or more agents 170-1 . . . 170-N, (170 generally), each responsible for one or more storage arrays 164. In operation, the agents 170 invoke the front end interface 169 for accessing the storage array 164 as a cohesive entity, in which the controller 167 abstracts the individual disk drives into a single storage entity, partitioned and subdivided according to logical partitions, groups, and redundancy mechanisms, discussed further below.

Figure 4:
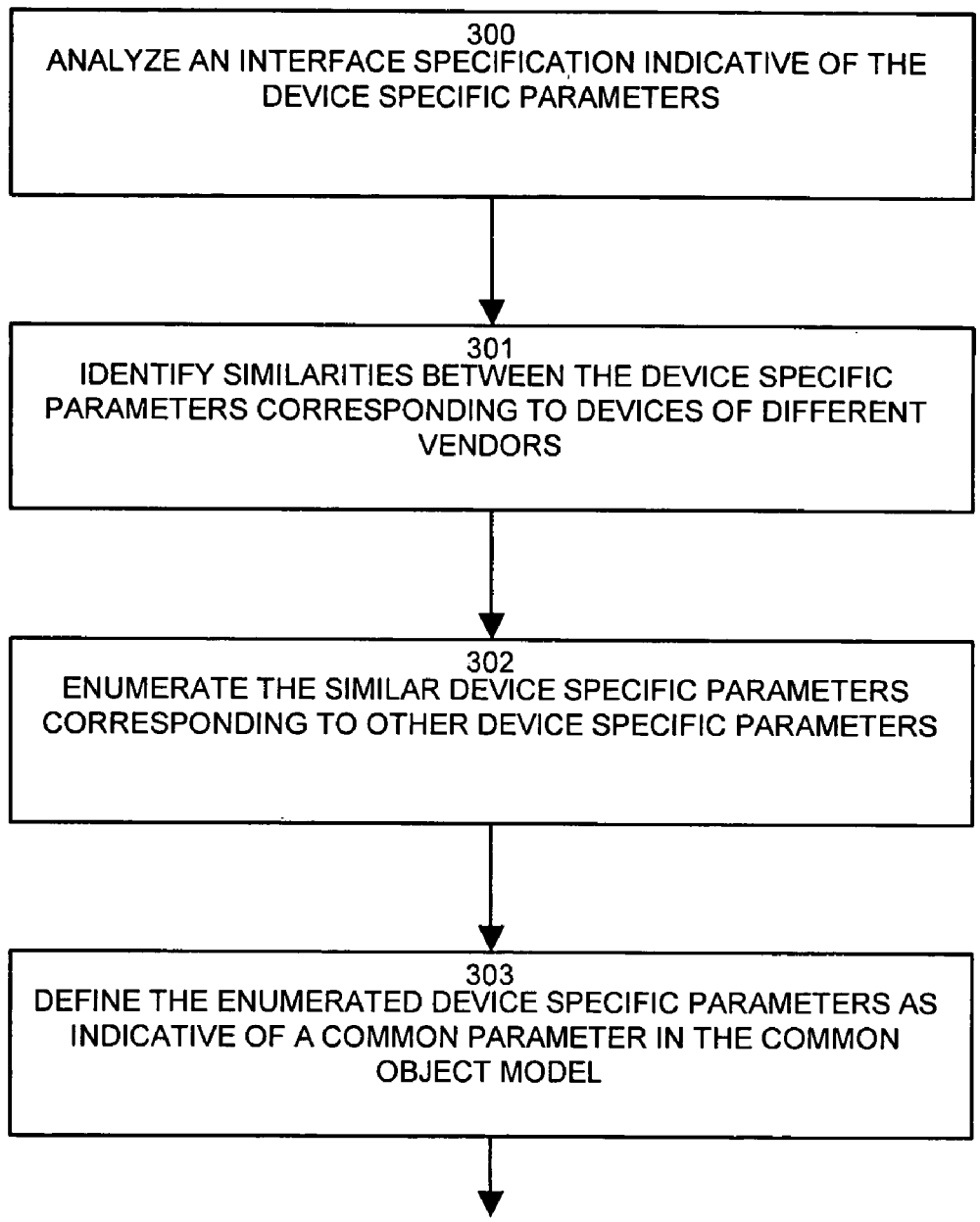
FIGS. 4-6 are a flowchart of device modeling as in FIG. 2 in greater detail.
Figure 5:
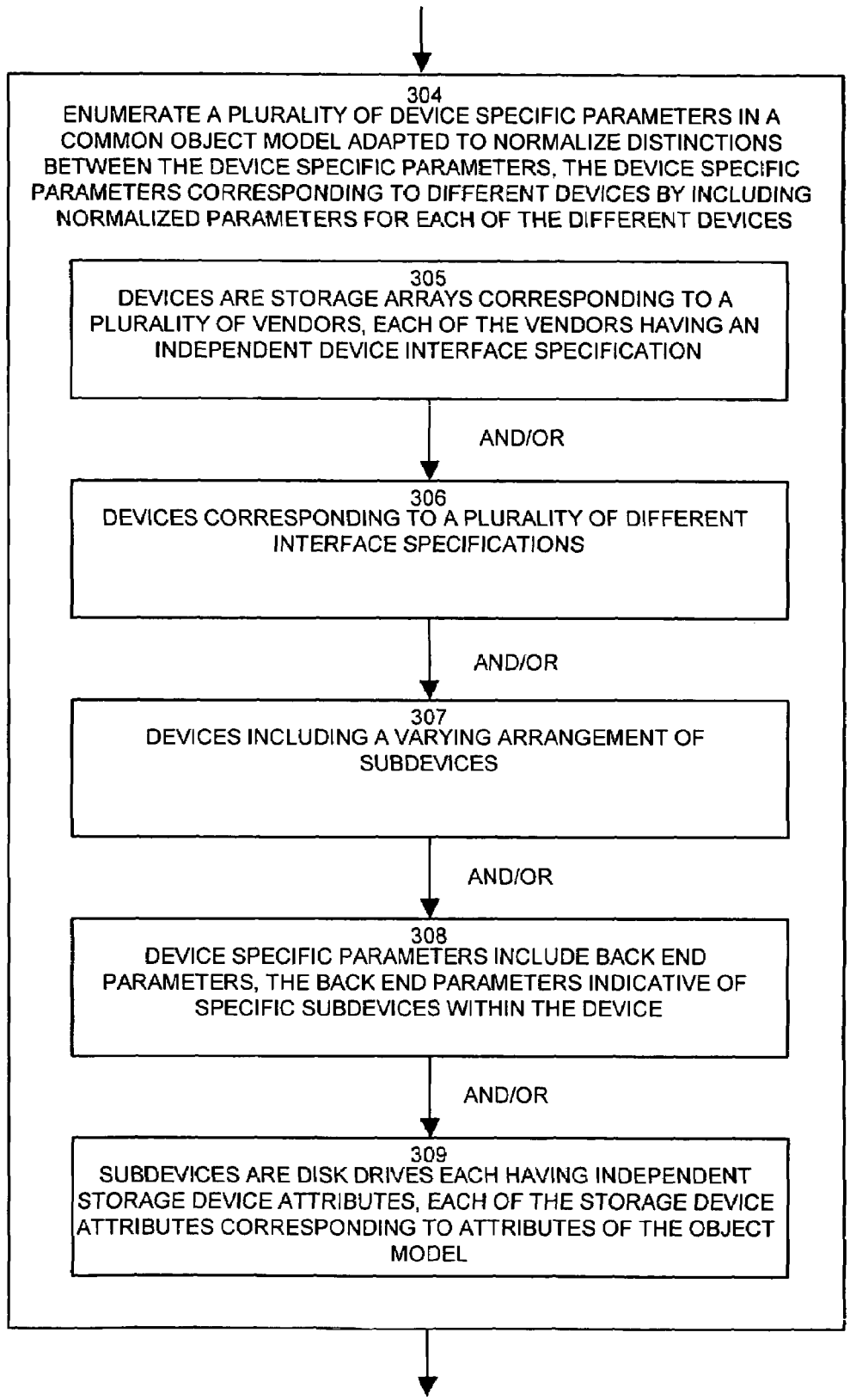
Figure 6:
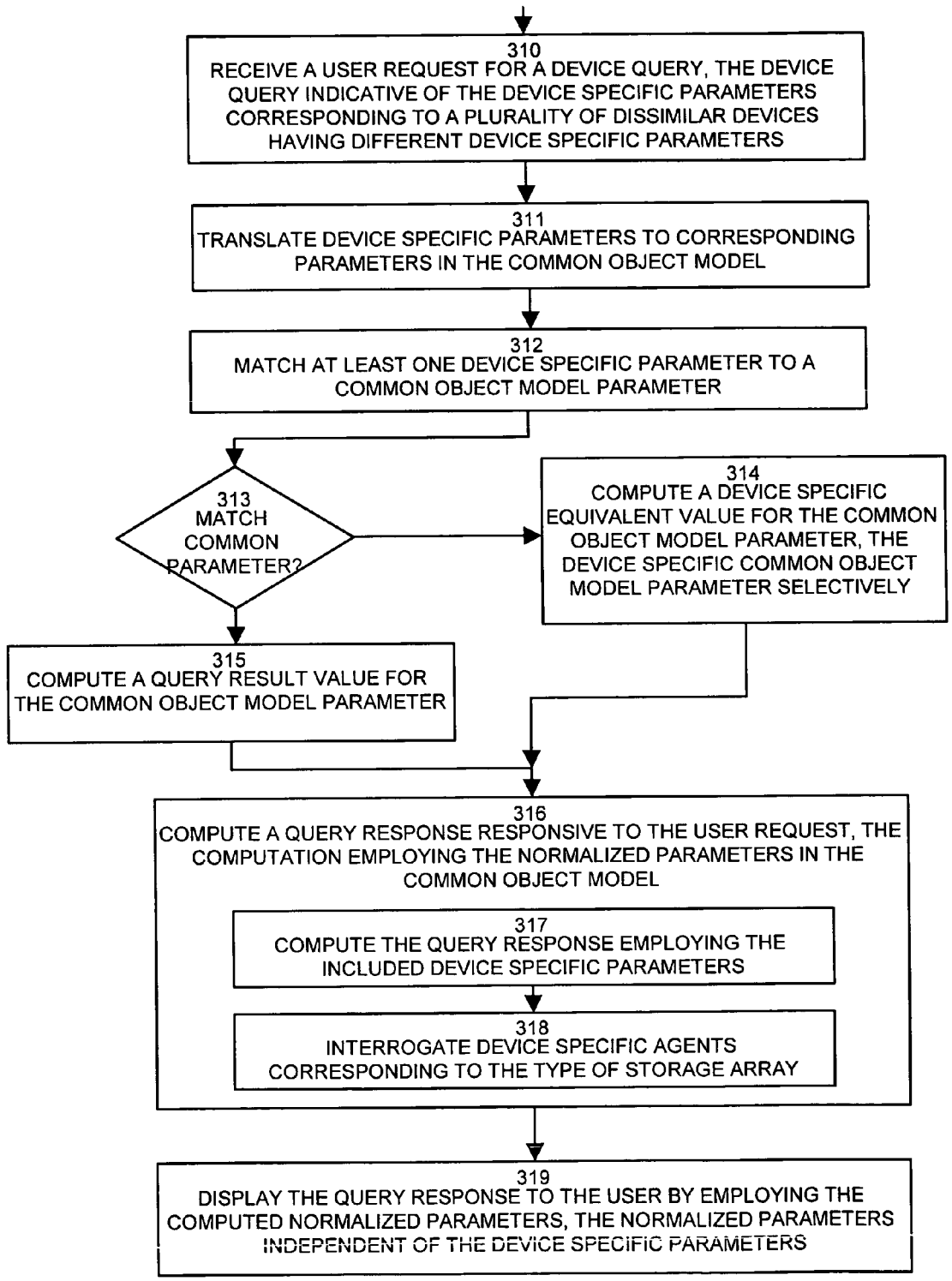

FIGS. 4-6 are a flowchart of device modeling as in FIG. 2 in greater detail. Referring to FIGS. 4-6, an automated or manual process analyzes an interface specification indicative of the device specific parameters corresponding to storage array devices 164, as depicted at step 300. Storage array devices 164 publish an interface specification, or API, for allowing developers access to the storage array device 164 and disk drives 166 therein. Such analysis may take the form of developers performing inspection of an interface specification corresponding to the storage array device 164 to be modeled, and identifying corresponding attributes in the object model 130. Alternatively, a parsing entity, such as a software process, parses an interface file including code definitions of the storage array device 164.

The analysis identifies similarities between the device specific parameters corresponding to devices 164 of different vendors, as shown at step 301. Dissimilar devices 164 typically have attributes in the API which collectively define certain general features common to typical storage array devices 164, such as variables pertaining to available space, for example. However, certain devices 164 may also have device specific parameters which tend to distinguish the storage array device 164 from those of other vendors. Accordingly, the analysis enumerates the similar device specific parameters corresponding to other device specific parameters, as shown at step 302. In other words, the analysis determines parameters or attributes of one vendor's API which match or bear a deterministic resemblance to parameters or attributes of another vendor's API. An example might be an API specifying space in units of bytes as opposed to say, fixed size 1024 byte pages, such that the available space is equated by multiplying the number of pages by 1024 to arrive at the number of bytes.

The object model 130 defines the enumerated device specific parameters as indicative of a common parameter in the common object model, as depicted at step 303. In a particular configuration, the object model 130 is a code file and the common parameters take the form of object definitions in the code file.

In addition to the common parameters, there may be other device specific parameters which do not appear to bear a relation to other storage array devices 164. Accordingly, the common object model 130 enumerates a plurality of device specific parameters adapted to normalize distinctions between the device specific parameters, in which the device specific parameters correspond to different devices 164 by including normalized parameters for each of the different devices 164, as depicted at step 304. Normalization of the device specific parameters therefore includes either identifying a common parameter or defining a device specific parameter as an attribute in the object model 130.

In further detail, at steps 305-309, in the exemplary configuration described, the development of the object model 130 models devices which are storage array devices 164 corresponding to a plurality of vendors, in which each of the vendors has an independent device interface specification, as disclosed at step 305. Accordingly, the devices correspond to a plurality of different interface specifications, or APIs, as depicted at step 306.

Each of the storage array devices including a varying arrangement of subdevices, such as disk drives arranged in an ordered manner and operable to be accessible as an integrated device, or contiguous storage volume, as depicted at step 307. Accordingly, the vendor published API may allow access to the aggregate, combined storage capacity of all the disk drives 166, and may not allow individual referencing of specific disk drives 166. Such detail suppression, while intended to simplify the user/developer view of the storage array device, 164, tends to remove control from the user/developer by providing only a so called "front end" perspective of the storage array device 164. The "back end" interface, which accesses the individual disk drives 166 rather than the integrated "whole" of the storage array device 164, is suppressed by such a front end API 169. Accordingly, the analysis of the device specific parameters include back end parameters, in which the back end parameters are indicative of specific subdevices, or disk drives 166 within the device 164, as depicted at step 308. Therefore, the exemplary configuration 100 shows that the subdevices are disk drives 166 each having independent storage device attributes, such that each of the storage device attributes corresponds to attributes of the resulting object model 130, as shown at step 309.

Following enumeration of the device specific parameters in the object model 130, the normalized parameters are codified in a code file or other object operable for accessing the back end 168 of the storage array device 164, as discussed further below with respect to FIG. 8. Accordingly, following suitable build procedures for compiling and instantiating the object model 130 with the management application 112, the management application 112 receives a user request for a device query 194, in which the device query 194 is indicative of the device specific parameters corresponding to a plurality of dissimilar devices 164 having different device specific parameters, as depicted at step 310. Depending on the configuration and the storage array devices included therein, the management application 112 translates device specific parameters to corresponding parameters in the common object model 130, as shown at step 311. The management application 112 identifies the attributes (parameters) in the object model for the storage array device or devices addressed by the query, and matches at least one device specific parameter from the query to a common object model 130 parameter, as disclosed at step 312.

The query 194 may request data from a common parameter, applicable to each type or storage array device 164, or may reference a device specific parameter instantiated for a subset of enumerated storage array device 164 types. Accordingly, a check is performed to determine if the computation of the query response 194 includes processing common or device specific parameters in the common object model 130, as depicted at step 313. If device specific parameters of the storage array device 164 are needed to process the query 194, then the management application 112 computes an equivalent value for the common object model parameter requested, in which the common object model parameter is applicable to device specific parameters of other devices, as depicted at step 314. In other words, certain device specific parameters may need to be interrogated to compute or translate a requested query value, such as computing bytes from pages as described above. In such an instance, the management application 112 references device specific parameters in the common object model 130 and processes the device specific parameters accordingly.

If the query response 190 requires only common parameters already enumerated in the common object model 130, then the management application 112 need not reference device specific parameters and computes one or more query result values from the referenced common object model 130 parameter.

As a particular query 194 may involve either device specific variables or common parameters, at step 316 the management application 112 computes the query response 190 responsive to the user request, in which the computation employing the normalized parameters in the common object model. In further detail, computation of the query response employs any included device specific parameters computed from step 314, as depicted at step 317. As indicated above, the query response 190 may request information from the back end interface 168 and, accordingly, computing the query response 190 further comprises interrogating device specific agents corresponding to the type of storage array to determine information and/or status from the individual disk drives 166, as depicted at step 318.

After computing the query response 190, management application 112 sends the query response as message 190 to the console 120, and accordingly, the console 120 displays the query response 190 to the user by employing the computed normalized parameters, in which the normalized parameters are rendered by a query response user interface 122, independently of the device specific parameters from which the query response 190 was computed, as depicted at step 319.

Figure 8:
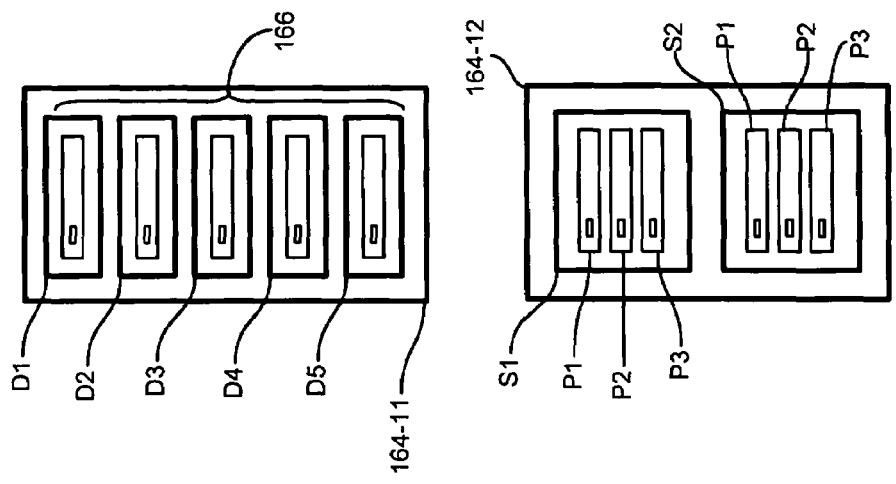
FIG. 8 is an example of storage array device computations employing the common object model as defined herein.
Figure 7:
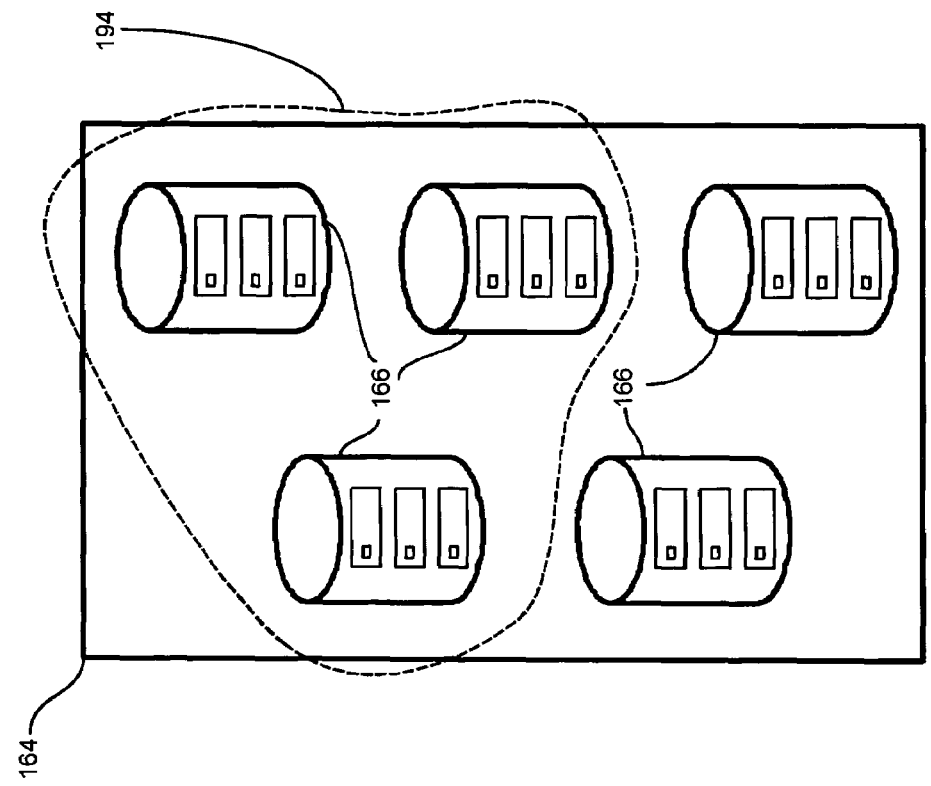
FIG. 7 is an example of configuring and processing a device according to the object model employing an exemplary storage array group.

FIGS. 7 and 8 are examples of configuring and processing a device according to the object model 130 employing an exemplary storage array group. In a storage array device 164, the controller 167 may organize and classify the individual disk drives 166 according to several protection mechanisms for providing redundancy, failover, and fault tolerance. For example, referring to FIG. 7, multiple disk drives 166 are often designated as a group 194 providing a virtual storage space on all disk drives of the group 194. The group 194 may be a shadow set, a journaling configuration, or a RAID configuration, as is known to those of skill in the art (RAID 0-RAID 5). A RAID configuration, for example, designates multiple disks, such as four, in such a manner that in the event of failure of one of the disk drives 166, the data is recoverable from the other drives in the group. Since such a group 194, in effect, overlaps the physical capacity of each of the disk drives 166, computation of the capacity considers the virtual space encompassed by the group 192. The object model 130 is operable to identify such overlap between the disk drives of a group 194, and computes an effective available capacity of a storage array device 164, by considering each individual disk drive 166 in view of grouping arrangements in place, as will now be described in one particular example with respect to FIG. 8.

Referring to FIG. 8, exemplary disk array devices 164-11 and 164-12 are shown. The devices 164-11 and 164-12 are dissimilar, as disk array device 164-11 includes five physical disks D1-D5, and disk drive 164-12 include two spindles S1 and S2, each with three platters P1-P3. Note that in a group 194, the individual disk drives 166 may be preferable of the same type, however, the exemplary computation herein is illustrative of the usage of the object model 130 to compute raw capacity of devices 164 including dissimilar disk drives 166.

The management application 112 employs the object model 130 for computing a variety of performance and other parameters relating to the storage array devices 164. Raw total capacity, available capacity, usable capacity, system capacity and allocated capacity, to name several exemplary computations, maybe sought. The object model 130 includes attributes for storing each of the variables relating to the capacity, D1-D5, S1-S5, and P1-P3. The object model 130 also indicates which attributes are applicable to a particular disk drive 166 in each storage array device 164. The management application 112 employs the object model to compute the raw total capacity for devices 164-11 and 164-12 as follows:

$$\text{Device } 164-11 = D1 + D2 + D3 + D4 + D5$$

$$\text{Device } 164-12 = S1 + S2$$

$$= S1 : P1 + P2 + P3$$
$$\phantom{=\ } S2 : P1 + P2 + P3$$

The illustrated computation is exemplary; other computations may involve more complex computations for the various statistical and performance data which employ computations using the object model.

It should be noted that the storage array devices, including the subdevices, or storage disks, are employed herein as an exemplary arrangement of the object model 130 in the context of a storage area network. The above discussion should not be taken as limiting the capabilities of the object model, which is operable to represent an arbitrary collection of devices and is intended to covers and normalize a variety of subcomponents, such as storage devices, storage device groupings, host director, host interface, and others, as well as inter-relationships between the objects.

Accordingly, the object model as discussed above discloses an exemplary user query of a storage array device, and is employable for modeling, displaying, and processing attributes and parameters of other devices. Further, as indicated above with respect to the back end parameters of the storage disks, the object model is operable for internal processing within the agents (manageable entities) for computations as well as active management of storage arrays typically expressed as graphical output.

The exemplary common object model processing disclosed herein may encompass a variety of alternate deployment environments. In a particular configuration, as indicated above, the exemplary SAN management application 112 discussed may be the EMC Control Center (ECC) application, marketed commercially by EMC corporation of Hopkinton, Mass., assignee of the present application.

Those skilled in the art should readily appreciate that the programs and methods for modeling and organizing data via the common object model as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for modeling and organizing data via the common object model has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of organizing data comprising:
   analyzing an interface specification indicative of device specific parameters;
   identifying similarities between the device specific parameters corresponding to devices of different vendors;
   enumerating a plurality of the device specific parameters in a common object model adapted to normalize distinctions between the device specific parameters, the device specific parameters corresponding to different devices by including normalized parameters for each of the different devices, including defining the enumerated device specific parameters as indicative of a common parameter in the common object model, the devices including a varying arrangement of subdevices, each of the subdevices having device specific parameters, the device specific parameters including back end parameters, the back end parameters indicative of specific subdevices within the device, wherein the subdevices are disk drives each having independent storage device attributes, each of the storage device attributes corresponding to attributes of the common object model;
   receiving a request for device attributes, the device attributes indicative of the device specific parameters corresponding to a plurality of dissimilar devices having different device specific parameters;
   computing a response responsive to the request, the computation employing the normalized parameters in the common object model, computing the response indicating interrogating device specific agents corresponding to the type of the device; and
   communicating the response by employing the computed normalized parameters, the normalized parameters independent of the device specific parameters.

2. The method of claim 1 further comprising:
   enumerating the similar device specific parameters corresponding to other device specific parameters.

3. The method of claim 2 further comprising:
   translating device specific parameters to corresponding parameters in the common object model, the translating further including:
   matching at least one device specific parameter to a common object model parameter; and
   computing an equivalent value for the common object model parameter, the common object model parameter applicable to device specific parameters of other devices.

4. The method of claim 1 further comprising computing the query response employing the included device specific parameters.

5. The method of claim 1 wherein the devices are storage arrays corresponding to a plurality of vendors, each of the vendors having an independent device interface specification.

6. The method of claim 5 wherein the devices corresponding to a plurality of different interface specifications.

7. A method of monitoring a managed information environment comprising:
   analyzing interface specifications for a plurality of devices, the devices including a varying arrangement of subdevices, each of the devices and subdevices having device specific parameters, the interface specification indicative of the device specific parameters, the device specific parameters including back end parameters, the back end parameters indicative of specific subdevices within the device;
   identifying commonalties and distinctions between each of the analyzed interface specifications;
   normalizing device specific parameters into a common object model, the common object model operable to store the device specific parameters for each of the plurality of device without enumerating the identified distinctions, the plurality of devices including a varying arrangement of subdevices, each of the subdevices having device specific parameters, the device specific parameters including back end parameters, the back end parameters indicative of specific subdevices within the device, wherein the subdevices are disk drives each having independent storage device attributes, each of the storage device attributes corresponding to attributes of the common object model;
   receiving a query from a user, the query requesting a response including device specific parameters;
   retrieving, from the common object model, the normalized device specific parameters corresponding to devices implicated by the query;

computing the query response employing the included device specific parameters and interrogating device specific agents corresponding to the type of the device;

displaying, to the user, the computed query response, the computer query response indicative of the device specific parameters and indifferent to the identified commonalities and distinctions.

8. The method of claim 7 wherein the devices implicated by the query include a plurality of disk drive devices, the disk drive devices further comprising a group indicative of protection mechanisms applicable to the group, and wherein the normalized device specific parameters are operable to indicate parameters applicable to the group.

9. The method of claim 7 wherein the parameters applicable to the group further include parameters selected from the group consisting of usable capacity, raw capacity, system capacity and allocated capacity.

10. A data management device operable to organize data according to a common object model comprising:

a management application operable to enumerate a plurality of device specific parameters in a common object model adapted to normalize distinctions between the device specific parameters, the device specific parameters corresponding to different device by including normalized parameters for each of the different devices, the devices including a varying arrangement of subdevices, each of the subdevices having the device specific parameters, the device specific parameters including back end parameters, the back end parameters indicative of specific subdevices within the device, wherein the subdevices are disk drives each having independent storage device attributes, each of the storage device attributes corresponding to attributes of the common object model;

a server operable to receive a user request for a device query, the device query indicative of the device specific parameters corresponding to a plurality of dissimilar devices having different device specific parameters;

a processor in the server operable to execute the management application to compute a query response responsive to the user request, the computation employing the normalized parameters in the common object model, the management application further operable to compute the query response by interrogating device specific agents corresponding to the type of the device; and an interface to a console operable to display the query response to the user by employing the computed normalized parameters, the normalized parameters independent of the device specific parameters.

11. The data management device of claim 10 wherein the management application is further operable to:

receive an analysis of an interface specification indicative of the device specific parameters, the analysis operable to identify similarities between the device specific parameters corresponding to devices of different vendors;

enumerate the similar device specific parameters corresponding to other device specific parameters; and define the enumerated device specific parameters as indicative of a common parameter in the common object model.

12. The data management device of claim 11 wherein the management application is further operable to:

translate device specific parameters to corresponding parameters in the common object model, the translating further including:

matching at least one device specific parameter to a common object model parameter; and computing an equivalent value for the common object model parameter, the common object model parameter applicable to device specific parameters of other devices.

13. The data management device of claim 10 wherein the management application is further operable to computing the query response employing the included device specific parameters.

14. The data management device of claim 10 wherein the devices are storage arrays corresponding to a plurality of vendors, each of the vendors having an independent device interface specification.

15. The data management device of claim 14 wherein the devices correspond to a plurality of different interface specifications.

16. A method of organizing data comprising:

enumerating a plurality of device specific parameters in a common object model adapted to normalize distinctions between the device specific parameters, the device specific parameters corresponding to different devices by including normalized parameters for each of the different devices, enumeration of device specific parameters further comprising identifying interrelationships between the devices, the devices including a varying arrangement of subdevices, each of the subdevices having device specific parameters, the device specific parameters including back end parameters, the back end parameters indicative of specific subdevices within the device, wherein the subdevices are disk drives each having independent storage device attributes, each of the storage device attributes corresponding to attributes of the common object model;

receiving a user request for a device query, the device query indicative of the device specific parameters corresponding to a plurality of dissimilar devices having different device specific parameters;

computing a query response responsive to the user request, the computation employing the normalized parameters in the common object model and retrieving the interrelations between the device, the normalized parameters further comprising the interrelationships between the devices, the normalized parameters indicative of other devices coupled to the device, computing the query response including interrogating device specific agents corresponding to the type of the device; and displaying the query response to the user by employing the computed normalized parameters, the normalized parameters independent of the device specific parameters.

17. The method of claim 16 wherein the coupling between devices includes organization selected from the group consisting of device groupings, host directors, host interfaces, clusters, redundancy, RAID, failover, and shadowing.

18. A computer program product having a computer readable storage medium operable to store computer program logic embodied in computer program code executable by a processor, encoded thereon for organizing data via a common object model comprising:

computer program code for enumerating a plurality of device specific parameters in a common object model adapted to normalize distinctions between the device specific parameters, the device specific parameters corresponding to different device by including normalized parameters for each of the different devices, the devices including a varying arrangement of subdevices, each of the subdevices having device specific parameters, the device specific parameters including back end parameters, the back end parameters indicative of specific subdevices within the device, wherein the subdevices are disk drives each having independent storage device attributes, each of the storage device attributes corresponding to attributes of the common object model;

computer program code for receiving a user request for a device query, the device query indicative of the device specific parameters corresponding to a plurality of dissimilar devices having different device specific parameters;

computer program code for computing a query response responsive to the user request, the computation employing the normalized parameters in the common object model, computing the query response including interrogating device specific agents corresponding to the type of the device; and computer program code for displaying the query response to the user by employing the computer normalized parameters, the normalized parameters independent of the device specific parameters.

19. A set of processor based instructions stored on a computer readable storage medium and executable by a processor responsive to the instructions, the instructions including program code for organizing data via a common object model comprising:

program code for analyzing an interface specification indicative of device specific parameters;

program code for identifying similarities between the device specific parameters corresponding to devices of different vendors;

program code for enumerating a plurality of the device specific parameters in a common object model adapted to normalize distinctions between the device specific parameters, the device specific parameters corresponding to different devices by including normalized parameters for each of the different devices, including defining the enumerated device specific parameters as indicative of a common parameters in the common object model, the devices including a varying arrangement of subdevices, each of the subdevices having device specific parameters, the device specific parameters including back end parameters, the back end parameters indicative of specific subdevices within the device, wherein the subdevices are disk drives each having independent storage device attributes, each of the storage device attributes corresponding to attributes of the common object model;

program code for receiving a user request for a device query, the device query indicative of the device specific parameters corresponding to a plurality of dissimilar devices having different device specific parameters;

program code for computing a query response responsive to the user request, the computation employing the normalized parameters in the common object model, computing the query response including interrogating device specific agents corresponding to the type of the device; and program code for displaying the query response to the user by employing the computed normalized parameters, the normalized parameters independent of the device specific parameters.

20. A data management device having a set of processor based instructions executable by a processor responsive to the instructions, the processor based instructions stored on a computer readable storage medium and operable to organize data according to a common object model, the instructions comprising:

means for enumerating a plurality of device specific parameters in a common object model adapted to normalize distinctions between the device specific parameters, the device specific parameters corresponding to different devices by including normalized parameters for each of the different devices, the devices including a varying arrangement of subdevices, each of the subdevices having device specific parameters, the device specific parameters including back end parameters, the back end parameters indicative of specific subdevices within the device, wherein the subdevices are disk drives each having independent storage device attributes, each of the storage device attributes corresponding to attributes of the common object model, the means for enumerating further comprising:

means for normalizing, including at least one of identifying, in the common object model, a common parameter or defining a device specific parameters as an attribute in the common object model, the normalized parameters codified for accessing the back end of the storage array device;

means for receiving a user request for a device query, the device query indicative of the device specific parameters corresponding to a plurality of dissimilar devices having different device specific parameters;

means for computing a query response responsive to the user request, the computation employing the normalized parameters in the common object model, computing the query response including interrogating device specific agents corresponding to the type of the device; and means for displaying the query response to the user by employing the computed normalized parameters, the normalized parameters independent of the device specific parameters.

* * * * *